(12) United States Patent
Segawa et al.

(10) Patent No.: US 7,195,581 B2
(45) Date of Patent: Mar. 27, 2007

(54) POWER TRANSMISSION DEVICE HAVING A TORQUE CONVERTER WITH A LOCKUP CLUTCH AND LOCKUP CONTROL METHOD FOR TORQUE CONVERTER

(75) Inventors: Satoshi Segawa, Atsugi (JP); Kazutaka Adachi, Yokohama (JP); Tatsuya Imamura, Machida (JP); Kouji Saitou, Yamato (JP); Morimasa Yamawaki, Yokohama (JP); Koji Dohi, Machida (JP); Toshiji Iida, Sagamihara (JP); Hiroshi Sekiya, Atsugi (JP)

(73) Assignees: Nissan Motor Co., Ltd., Yokohama (JP); Jatco Ltd, Fuji (JP)

( * ) Notice: Subject to any disclaimer, the term of this patent is extended or adjusted under 35 U.S.C. 154(b) by 195 days.

(21) Appl. No.: 10/953,384

(22) Filed: Sep. 30, 2004

(65) Prior Publication Data
US 2005/0101434 A1    May 12, 2005

(30) Foreign Application Priority Data
Nov. 12, 2003   (JP)   .............................. 2003-382637

(51) Int. Cl.
*B60W 10/02* (2006.01)
(52) U.S. Cl. ..................................... 477/180
(58) Field of Classification Search .................. 477/62, 477/70, 168, 174, 180; 701/67, 68, 51; 192/3.29, 192/3.3, 3.31
See application file for complete search history.

(56) References Cited

U.S. PATENT DOCUMENTS 5,643,137 A * 7/1997 Suzuki ........................ 477/169
5,722,912 A * 3/1998 Narita .......................... 477/64
5,879,266 A * 3/1999 Sawamura et al. ........... 477/62
6,009,988 A * 1/2000 Saito et al. ................. 192/3.29
6,565,483 B2 * 5/2003 Segawa et al. ............. 477/174
6,652,415 B2 * 11/2003 Segawa et al. ............... 477/62
6,928,357 B2 * 8/2005 Higashimata et al. ......... 701/87

FOREIGN PATENT DOCUMENTS

| JP | 2665597 B2 | 6/1997 |
|---|---|---|
| JP | 2000-145949 A | 5/2000 |
| JP | 2000-240786 A | 9/2000 |
| JP | 3183235 B2 | 4/2001 |
| JP | 3230465 B2 | 9/2001 |
| JP | 3240979 B2 | 10/2001 |

* cited by examiner

*Primary Examiner*—Ha Ho
*Assistant Examiner*—Justin K. Holmes
(74) *Attorney, Agent, or Firm*—Foley & Lardner LLP

(57) ABSTRACT

A controller (5) performs open loop control of the engaging state of a lockup clutch (2) through a switching mechanism (3, 4) when a torque converter (1) transitions from a first state in which the lockup clutch (2) is disengaged to a second state in which the lockup clutch (2) is at least partially engaged. At this time, the controller (5) estimates the engine torque at the time when open loop control ends, estimates a necessary lockup capacity required for the converter (1) at the time when open loop control ends, based on the estimated engine torque, and controls the engaging state of the lockup clutch (2) through the switching mechanism (3, 4) to make the lockup capacity at the time when open loop control ends become the necessary lockup capacity.

19 Claims, 15 Drawing Sheets

POWER TRANSMISSION DEVICE HAVING A TORQUE CONVERTER WITH A LOCKUP CLUTCH AND LOCKUP CONTROL METHOD FOR TORQUE CONVERTER

FIELD OF THE INVENTION

This invention relates to a power transmission device having a torque converter with a lockup clutch.

BACKGROUND OF THE INVENTION

Torque converters exist which are capable of switching between three operation states, a converter state, a lockup state, and a slip state.

The converter state is a state in which input elements and output elements are completely released, and torque is transmitted through a fluid. The lockup state is a state that is selected in an operating region where torque increasing actions and transmission shock absorption functions are not necessary, in order to reduce degradation of fuel efficiency caused by slippage of the torque converter. The input elements of the torque converter are directly connected to the output elements in this state. The slip state maintains a state in which slip develops between the input elements and the output elements with the lockup clutch in a half connected state.

In JP2665597B, when a lockup differential pressure increases such that a torque converter reaches a slip state from a converter state, the maximum amount for the lockup differential pressure is set based on a slip rotational speed $\Delta N$ ($\Delta N$=a turbine runner rotational speed Nt–an engine rotational speed Ne) when control begins.

Among parameters that determine the slip rotational speed (the turbine runner rotational speed Nt and the engine rotational speed Ne), the turbine runner rotational speed (transmission input rotational speed) depends upon running resistance and grade resistance. When comparing running along a flat roadway and running along a climbing roadway, for example, the turbine runner rotational speed increases more slowly for the climbing roadway than for the flat roadway.

For a continuously variable transmission, the turbine runner rotational speed is a value that is determined according to vehicle speed. Accordingly, the rate of increase in the turbine runner rotational speed is determined by the rate of increase in the vehicle speed during a period until reaching a point where speed changes begin. Referring to FIG. 22, when acceleration is effected from a vehicle speed VSP=0 with a throttle opening TVO=3/8, speed changes begin from a point where the vehicle speed corresponding to a point A in the drawing is reached, toward a Hi side. The gear change ratio remains at a least Low value in a period up to that point.

However, the conventional technique described above does not take into consideration the fact that the turbine runner rotational speed depends upon the running resistance, the grade resistance, and the like during the period until speed changes begin. The amount of increase in the lockup differential pressure is thus set based only on information at the start of control, and torque converter transition is effected from the converter state to the slip state under open loop control.

For example, the same amount of increase is set when running along a flat roadway and when running along a climbing roadway. Accordingly, referring to FIG. 16A, the torque converter transition from the converter state to the slip state takes place after the vehicle speed has sufficiently increased when running a flat roadway. However, referring to FIG. 16B, the torque converter transition to the slip state takes place before the vehicle speed increases. The torque converter transition to the slip state is complete before open loop control ends at a low turbine runner rotational speed. Accordingly, muffled sounds and vibrations tend to develop, and further, the torque converter transition to the slip state takes place at a turbine runner rotational speed that is lower than normal. A stepwise change in the engine rotational speed when transitioning to the slip state thus becomes larger.

SUMMARY OF THE INVENTION

An object of the present invention is therefore to perform smooth control when transitioning from a converter state to a slip state by open loop control, by eliminating sudden locking and locking delays in a lockup clutch.

In order to achieve above object, this invention provides a power transmission device which transmits power of an engine to a drive wheel, the power transmission device comprising: an automatic transmission; a torque converter comprising a lockup clutch, the torque converter being disposed between the engine and the automatic transmission; a switching mechanism which switches an engaging state of the lockup clutch; and a controller which performs open loop control of the engaging state of the lockup clutch through the switching mechanism, when the torque converter transitions from a first state in which the lockup clutch is disengaged to a second state in which the lockup clutch is at least partially engaged.

The controller estimates a torque of the engine at a time when the open loop control ends; estimates a necessary lockup capacity required for the converter at the time when the open loop control ends, based on the estimated torque of the engine; and controls the engaging state of the lockup clutch through the switching mechanism to make a lockup capacity at the time when the open loop control ends become the necessary lockup capacity.

According to an aspect of this invention, this invention provides a lockup control method for a torque converter, in which open loop control is performed on an engaging state of a lockup clutch when the torque converter transitions from a first state in which the lockup clutch is disengaged to a second state in which the lockup clutch is at least partially engaged. The lockup control method comprises estimating an engine torque at a time when the open loop control ends; estimating a necessary lockup capacity required for the converter at a time when open loop control ends, based on the estimated engine torque; and controlling the engaging state of the lockup clutch to make a lockup capacity at the time when the open loop control ends become the necessary lockup capacity.

The details as well as other features and advantages of this invention are set forth in the remainder of the specification and are shown in the accompanying drawings.

DETAILED DESCRIPTION OF THE PREFERRED EMBODIMENTS

Figure 1:
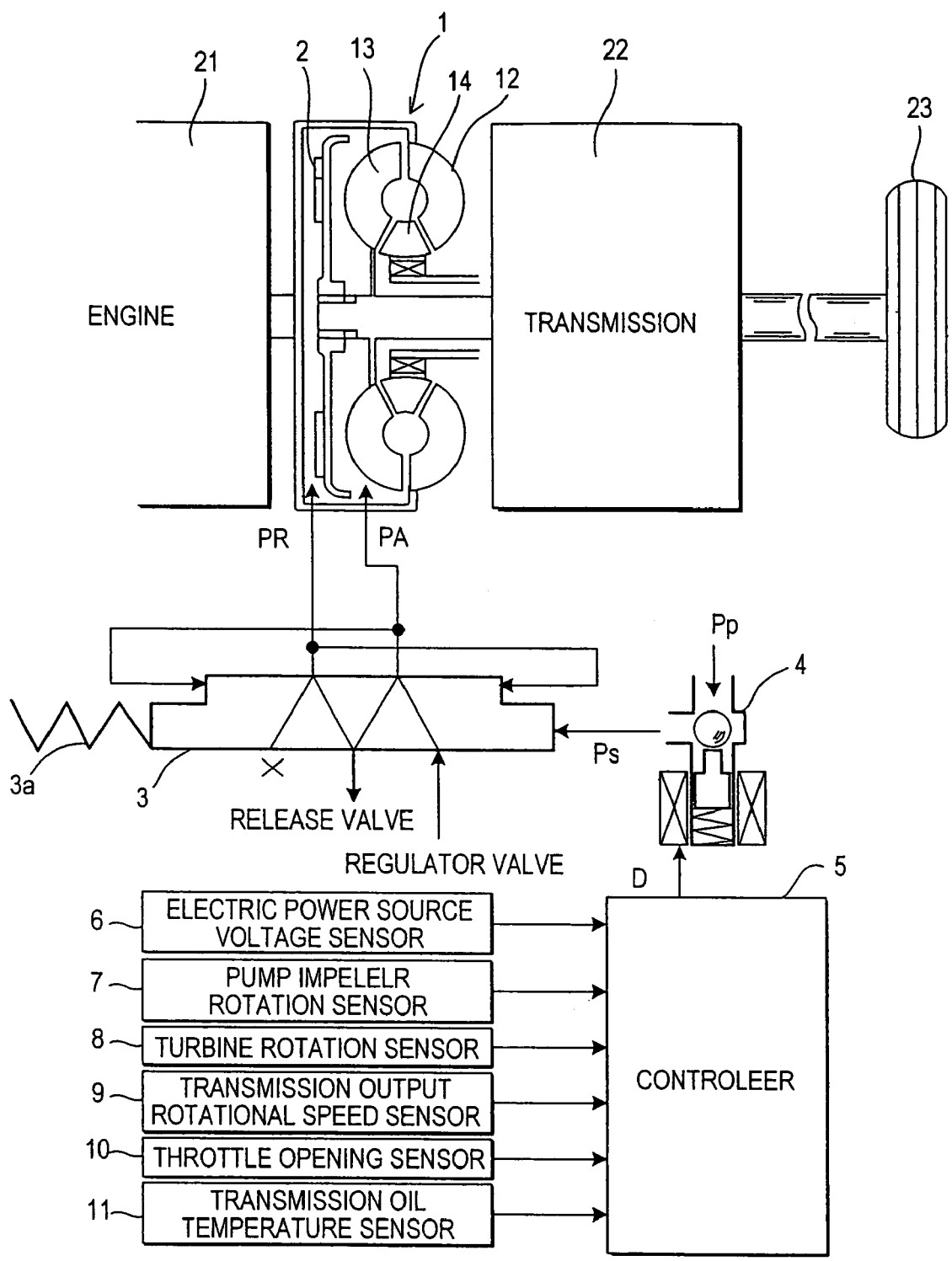
FIG. 1 is a schematic structural diagram of a power transmission mechanism according to this invention.

Referring to FIG. 1, a torque converter 1 is disposed between an engine 21 and an automatic transmission 22. Power from the engine 21 is transmitted to drive wheels 23 through the torque converter 1, the automatic transmission 22, and a final reduction gear (not shown). The automatic transmission 22 may be a belt or a toroidal continuously variable transmission, for example.

The torque converter 1 comprises a pump impeller 12 that is connected to a crankshaft of the engine 21, a turbine runner 13 that is disposed opposite the pump impeller 12, and a stator 14 that interposes between the turbine runner 13 and the stator 14.

When the engine 21 rotates the pump impeller 12 and torque-converter oil is pushed out from the pump impeller 12, the turbine runner 13 receives the pushed out oil and rotates. When the rotational speed of the turbine runner 13 is low compared to the rotational speed of the pump impeller 12, a force that promotes rotation remains in the torque converter oil that flows out from the turbine runner 13. The stator 14 changes the flow direction of the torque converter oil, which returns to the pump impeller 12. A force in a rotational direction urges the torque converter oil, and torque increases (converter state).

A lockup clutch 2 that rotates together with the turbine runner 13 is built into the torque converter 1. A lockup state, in which input elements and output elements are directly connected, results when the lockup clutch 2 engages the pump impeller 12. Further, a slip state, in which slippage occurs between the input elements and the output elements, results when the lockup clutch 2 is partially engaged.

The lockup clutch 2 operates in response to a differential pressure $\Delta P$ between a torque converter applied pressure PA from a regulator valve and a torque converter release pressure PR from a release valve that act on both sides of the lockup clutch 2 ($\Delta P = PA - PR$). The lockup clutch 2 disengages when the release pressure PR is higher than the applied pressure PA, and the lockup clutch 2 engages when the release pressure PR is lower than the applied pressure PA.

The engaging force of the lockup clutch 2, that is, the lockup capacity, is determined by the differential pressure $\Delta P$. The engaging force of the lockup clutch 2 increases as the differential pressure $\Delta P$ becomes higher, and the lockup capacity increases.

The differential pressure $\Delta P$ is controlled by a lockup control valve 3. The applied pressure PA and the release pressure PR act on the lockup control valve 3 in opposing directions. An urging force of a spring 3a acts on the lockup control valve 3 in the same direction as that of the applied pressure PA, and a signal pressure Ps acts on the lockup control valve 3 in the same direction as that of the release pressure PR. The lockup control valve 3 determines the differential pressure $\Delta P$ so that the hydraulic pressure and the urging force of the spring are in balance.

A lock up solenoid 4 produces the signal pressure Ps that acts on the lockup control valve 3 in accordance with a duty ratio D, with a pump pressure PP taken as an original pressure. A controller 5 controls the differential pressure $\Delta P$ through the lockup solenoid 4.

The controller 5 comprises at least one microprocessor, an input-output interface, a ROM, a RAM, and the like. Signals indicating running states of a vehicle and driving states of a driver are input to the controller 5. For example, a signal from a transmission output rotation sensor 9 that is provided to the automatic transmission 22, a signal from a turbine rotation sensor 8 of the torque converter 1, the signal indicating the rotational speed of the turbine runner (input rotational speed of the transmission), a signal from a pump impeller rotation sensor 7 that detects the input rotational speed to the torque converter 1 (the engine rotational speed Ne), the signal indicating the pump impeller rotational speed, a signal from a throttle opening sensor 10 (a throttle opening TVO or an accelerator operation amount), a signal from a transmission oil temperature sensor 11, and the like are input to the controller 5. The controller 5 controls engaging states of the lockup clutch 2 (engaged, disengaged, or slip) based on the detected signals. It should be noted that the vehicle speed VSP is found by multiplying a transmission output rotational speed detected by the output rotational speed sensor 9 by a predetermined constant.

The controller 5 performs open loop control on the engaging state of the lockup clutch 2 when the torque converter 1 is to be switched from a converter state to a slip state. The duty ratio D of the lockup solenoid 4 that achieves a predetermined engaging state is determined, and the duty ratio D is corrected in accordance with an electric power source voltage signal from an electric power source voltage sensor 6.

Figure 3:
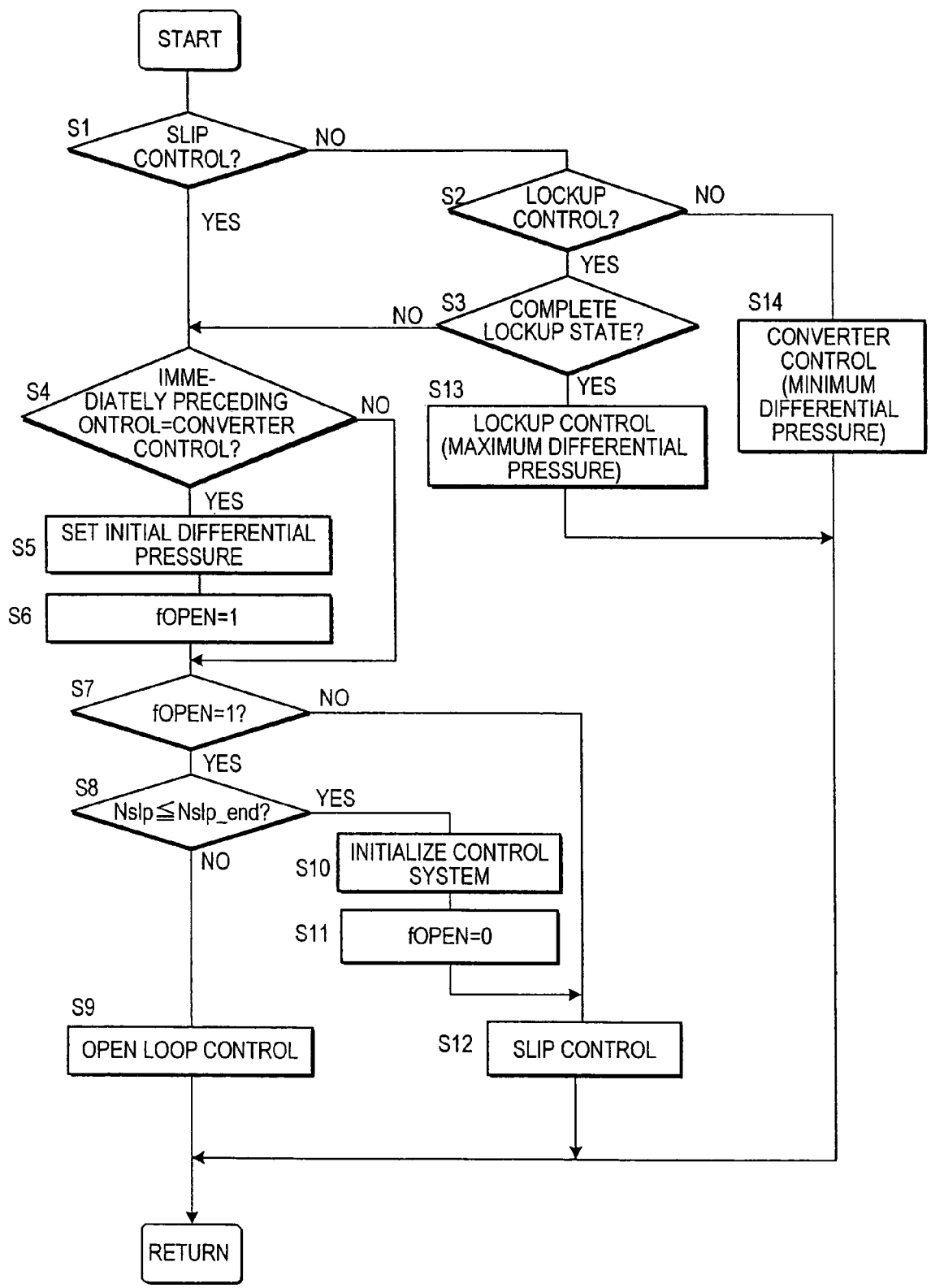
FIG. 3 is a flowchart that shows computational processing, performed by a controller, of a differential pressure command value.

Referring to FIG. 3, computational processing for a differential voltage command value is explained from among different types of control performed by the controller 5. This processing is executed for predetermined periods (several tens of milliseconds, for example). Slip control, converter control, and lockup control are control types for maintaining the torque converter 1 in the slip state, in the converter state, and in the lockup state, respectively.

Figure 10:
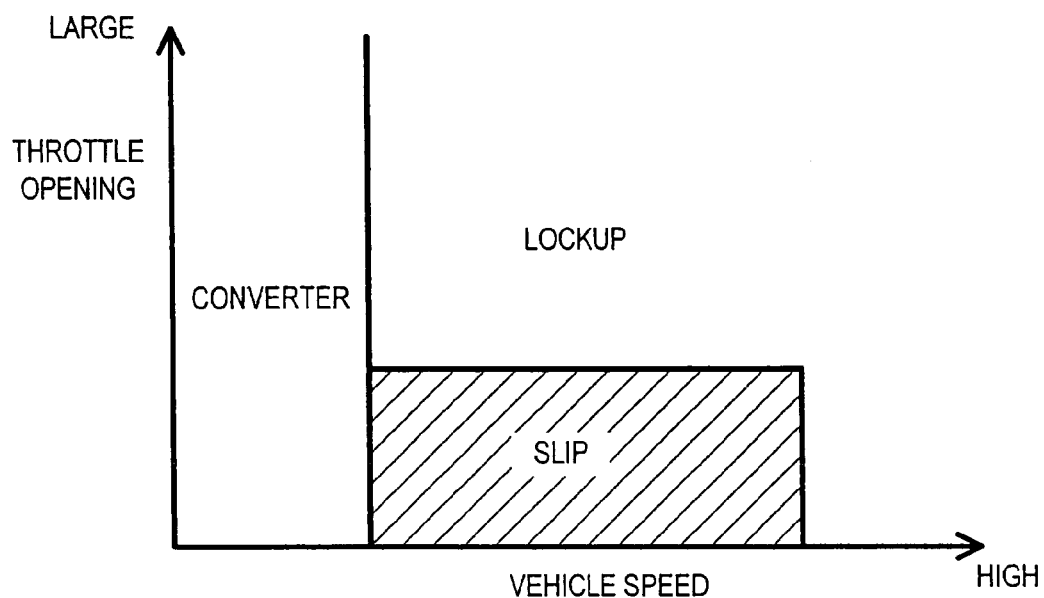
FIG. 10 is a map that shows relationships of torque converter control states with respect to vehicle speed and throttle opening.

Referring to a map shown in FIG. 10, it is determined in a step S1 of FIG. 3 whether or not it is the slip control that should be performed at present, based on the current throttle opening TVO and the current vehicle speed VSP.

Control proceeds to a step S4 when it is determined to perform slip control. Otherwise control proceeds to a step S2. In the step S2, it is determined, in a manner similar to that of the step S1, whether or not it is the lockup control that should be performed at present. Control proceeds to a step S3 when it is determined to perform lockup control. Otherwise control proceeds to a step S14.

In the step S3 it is determined whether or not transition to a complete lockup state (state where a differential pressure command is at maximum) has been effected in lockup control. Lockup ends when the transition has been effected, and control thus proceeds to a step S13. On the other hand, when the transition has not been effected, control proceeds to a step S4 in order to perform control for transitioning to a lockup state together with slip control.

It is determined in the step S4 whether or not the immediately preceding control was converter control. Control proceeds to a step S5 when the immediately preceding control was converter control. Otherwise control proceeds to a step. S7.

Figure 8:
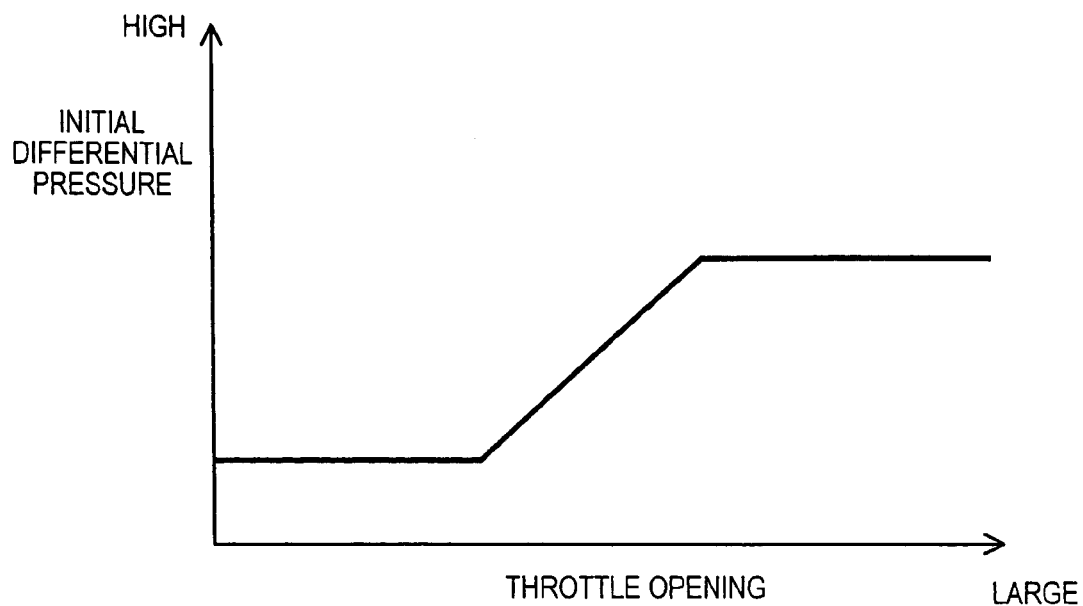
FIG. 8 is a table that shows a relationship between throttle opening and initial differential pressure.

In the step S5, referring to a table in FIG. 8, an initial differential pressure is set based on the current throttle opening TVO. A flag fOPEN is set to "1" indicating that open loop control is being executed in a step S6.

Therefore, in the steps S4 to S6, preparative processing (the steps S5 and S6) for starting pressurization processing by open loop control is performed only when the torque converter 2 transitions from the converter state to the slip state or to the lockup state for the first time. Preparative processing is not performed for the second and subsequent times.

In the step S7 it is determined, by using the flag fOPEN set in the step S6, whether or not pressurization operations are being executed by open loop control. When it is determined that pressurization operations are being executed (fOPEN=1), control proceeds to a step S8. Otherwise (fOPEN=0) control proceeds to a step S12.

Figure 9:
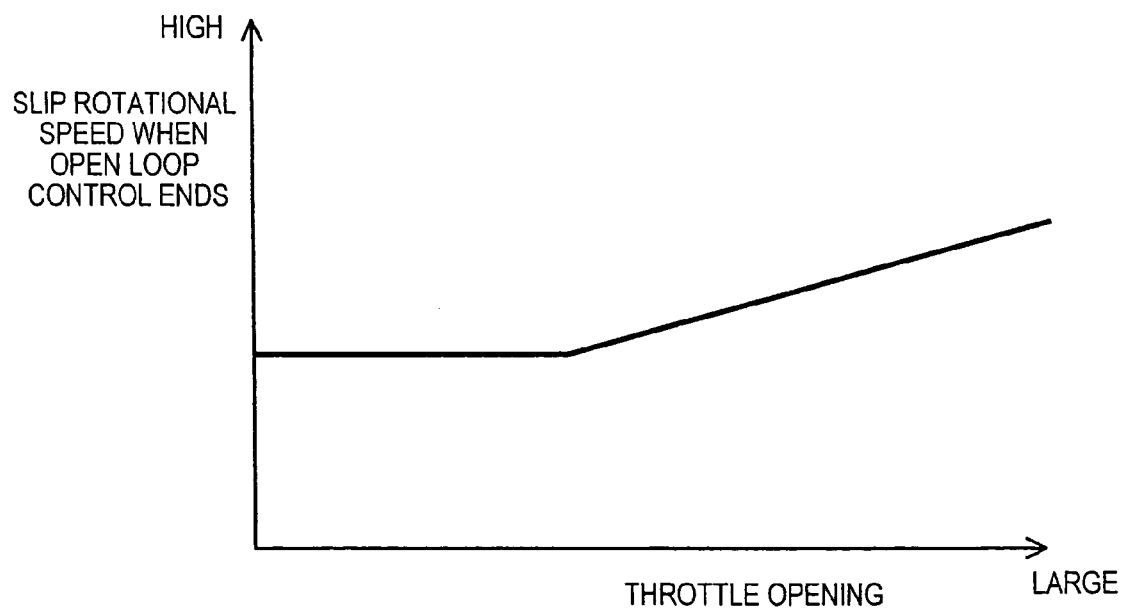
FIG. 9 is a table that shows a relationship between throttle opening and a slip rotational speed when open loop control ends.

Referring to a table of FIG. 9, in the step S8, the slip rotational speed Nslp_end at the end of open loop control is computed based on the current throttle opening TVO, in order to determine whether or not to finish pressurization operations by open loop control. A current slip rotational speed Nslp is then compared with the slip rotational speed Nslp_end at the end of open loop control. When the current slip rotational speed Nslp is equal to or less than the slip rotational speed Nslp_end at the end of open loop control, it is determined that the slip rotational speed begins to respond to a differential pressure command by pressurization operations and that differential pressure control has now become ready. The pressurization operations by open loop control thus ends and control proceeds to a step S10, and processing for switching to slip control is performed. The slip rotational speed is the difference between the pump impeller rotational speed and the turbine runner rotational speed. When the current slip rotational speed Nslp is larger than the slip rotational speed Nslp_end at the end of open loop control, it is determined that the slip rotational speed has not yet responded to increases in the differential pressure command. Control then proceeds to a step S9.

In the step S9, a differential pressure command value during open loop control is computed by computational processing of FIG. 2 described hereinafter.

On the other hand, in the step S10 the pressurizations operations by open loop control end, and initialization of the control system is performed in order to switch to slip control. Integrators and the like that are used in slip control computations are initialized in correspondence with a differential pressure command at the beginning of slip control. A procedure that is disclosed in JP2000-145949A, published by the Japan Patent Office in 2000, can be used for the initialization processing.

In a step S11, the flag fOPEN, which indicates that pressurization operations are being implemented by open loop control from the converter state, is cleared (fOPEN=0), and control then proceeds to the step S12.

In the step S12, slip control is performed. A necessary differential pressure command value is computed in slip control by performing feedback control so that the actual slip rotational speed Nslp coincides with a set target slip rotational speed. A control system like that disclosed in JP03240979B, JP03183235B, or JP03230465B can be used as this type of feedback control system. Further, a control system disclosed in JP2000-240786A, published by the Japan Patent Office in 2000, can be used for pressurization operations from the slip state to the lockup state. It should be noted that this invention relates to open loop control. Accordingly, a detailed description of the above control portions is omitted.

As described above, setting of the differential pressure command value during open loop control is set in the step S9, switching from open loop control to slip control is performed in the steps S10 and S11, and computation of the differential pressure command value during slip control is performed in the step S12.

In the step S13, engaging operations (complete lockup) during lockup control end, resulting in a state where the differential pressure maintains a maximum value. In the step S14, disengaging operations (un-lockup) of the lockup clutch during converter control end, resulting in a state where the differential pressure maintains a minimum value. When converter control is selected, however, and there is a difference between the differential pressure command value at the time of computation and a set minimum pressure, the differential pressure is changed gradually toward the minimum pressure value by predetermined change amounts so that the minimum pressure value is not set suddenly.

Referring to a control block diagram of FIG. 2, the computation of the differential pressure command value during open loop control in the step S9 of FIG. 3 is explained next.

In a block B100, by referring to a table of FIG. 9, the desired final rotational speed to be achieved (the slip rotational speed at the end of open loop control) Nslp_end is set based on the current throttle opening TVO, by open loop control that is executed before speed changes begin during increases of the turbine runner rotational speed (transmission input rotational speed).

Figure 11:
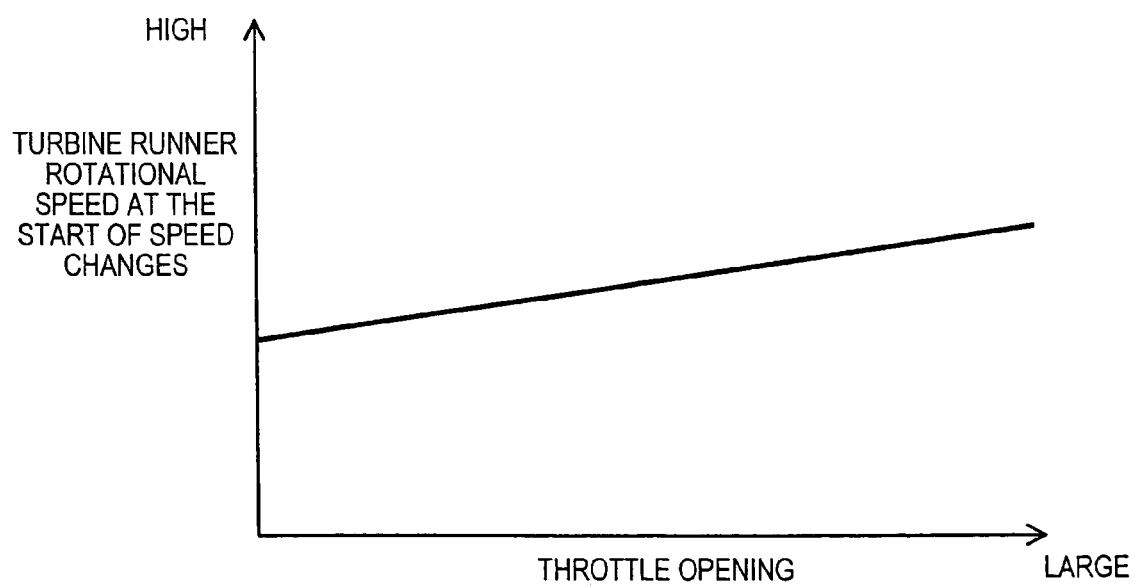
FIG. 11 is a table that shows a relationship between throttle opening and turbine runner rotational speed at start of speed changes.

In a block B101, by referring to a table of FIG. 11, a turbine runner rotational speed Nt2 that achieves the slip rotational speed Nslp_end at the end of open loop control is set based on the current throttle opening TVO. The turbine runner rotational speed Nt2 is defined as the turbine runner rotational speed at the point when speed changes begin.

Figure 17:
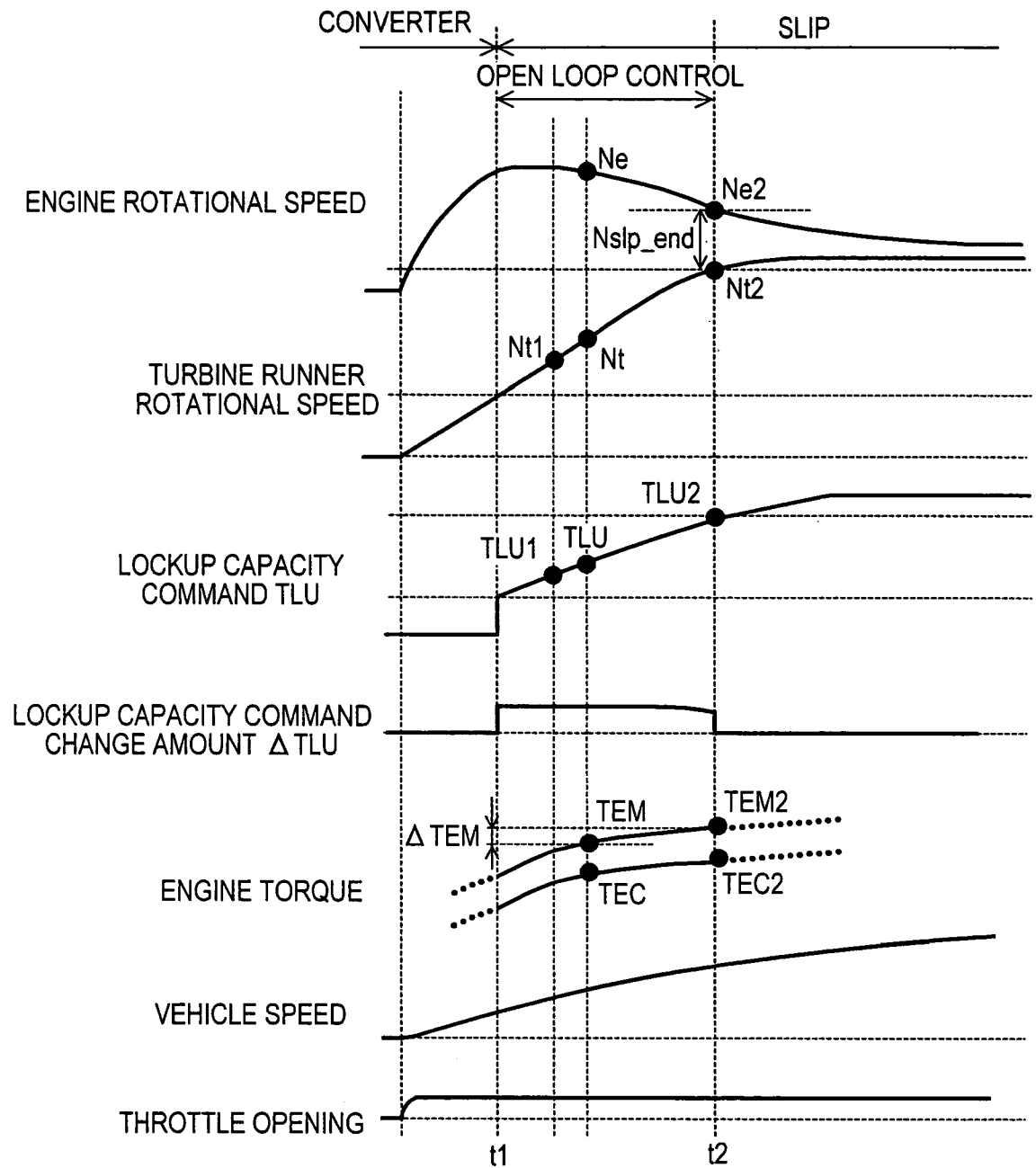
FIG. 17 is a timing chart that shows states when a torque converter transitions from a converter state to a slip state when starting from a stopped state.
Figure 22:
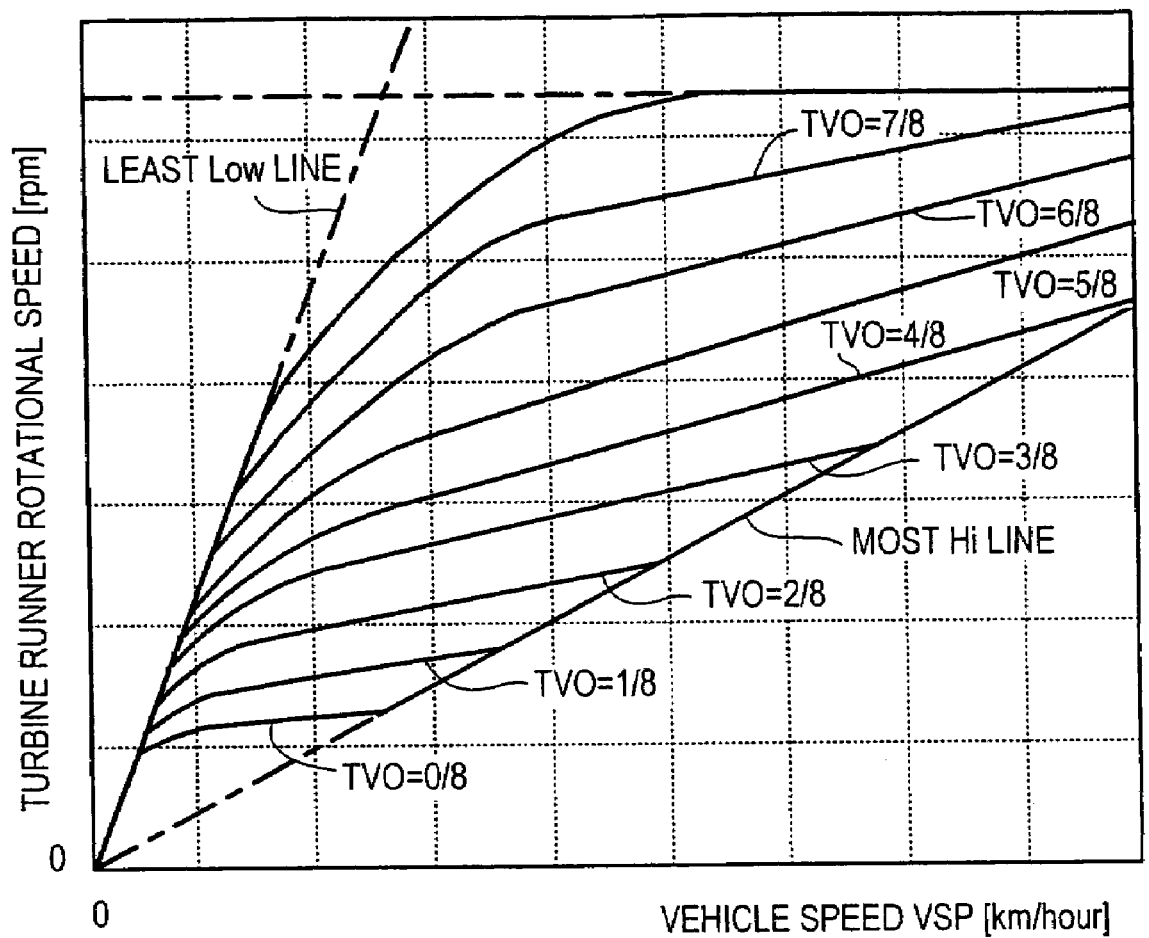
FIG. 22 is a map that shows relationships of turbine runner rotational speed with respect to vehicle speed and throttle opening.

As indicated by a time t2 in FIG. 17, the term "the point when speed changes begin" means a timing at which the turbine runner rotational speed reaches a constant speed or a rate of change in the turbine runner rotational speed begins to moderate (at a point A in FIG. 22 and after), following the beginning of speed changes in the transmission 22.

In a block B102, a control torque with which the slip rotational speed becomes the slip rotational speed Nslp_end at the turbine runner rotational speed Nt2 at the set start point of speed changes is calculated as a converter torque TCNV2 at the end of open loop control.

The converter torque TCNV2 at the end of open loop control is computed from Eq. (1) below.

$$TCONV2 = C \cdot Ne2^2 = C \cdot (Nt2 + Nslp\_end)^2 \qquad (1)$$

Figure 6:
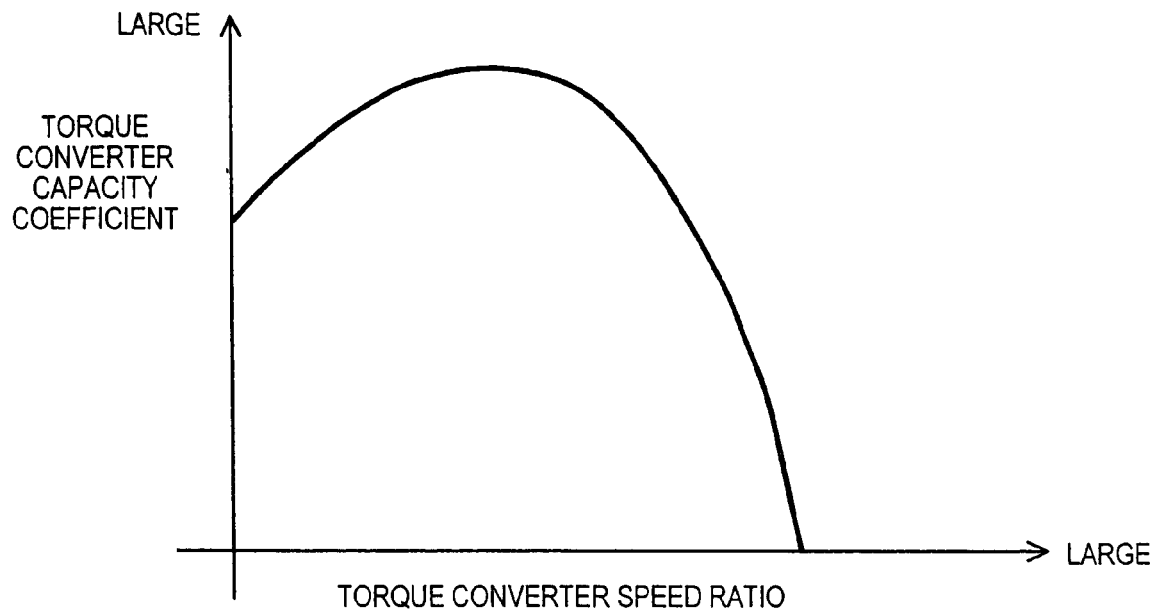
FIG. 6 is a table that shows a relationship between speed ratio and capacity coefficient of a torque converter.

A coefficient C is a capacity coefficient that indicates characteristics of the torque converter 1, and symbol Ne2 is an engine rotational speed at the point when open loop control ends (when speed changes begin). Referring to FIG. 6, the capacity coefficient C is determined as a value with respect to a speed ratio e, and the speed ratio e is a value found by dividing the turbine runner rotational speed Nt by the engine rotational speed Ne.

In a block B103, current engine torque data TEC, which is acquired from an engine controller that controls the engine 21 through a control network inside the vehicle, is set.

In a block B104, the engine rotational speed Ne2 at the point when speed changes begin is computed by using the turbine engine runner rotational speed Nt2 at the point when speed changes begin, which is set in the block B101, and the slip rotational speed Nslp_end, which is set in the block B102 (Ne2=Nt2+Nslp_end). An estimated value TEM2 for the engine torque at the point when speed changes begin is then computed from an overall engine performance map shown in FIG. 5 by using the engine rotational speed Ne2 at the point when speed changes begin and the current throttle opening TVO.

Figure 5:
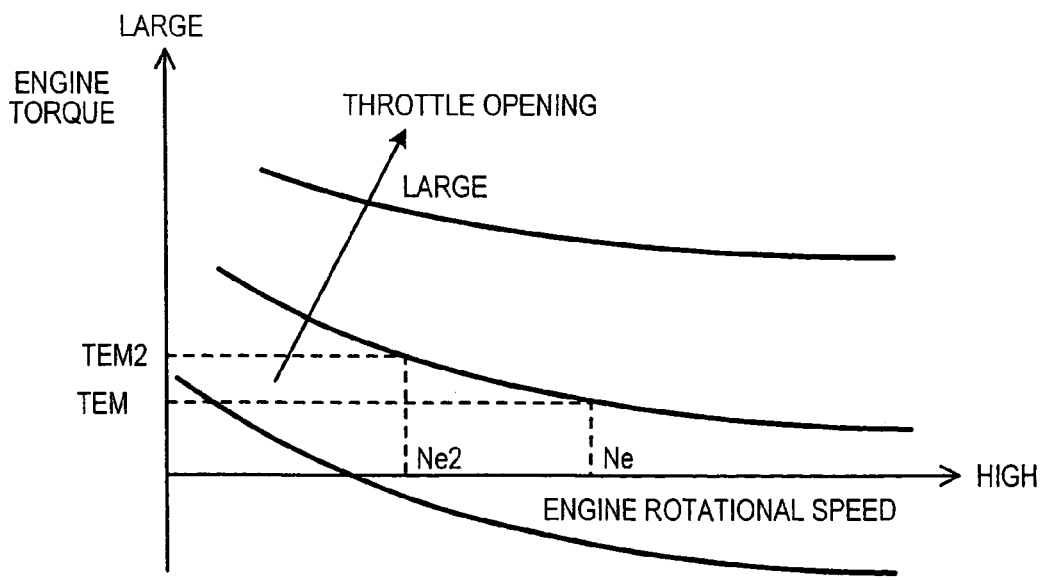
FIG. 5 is an overall engine performance map that shows relationships of engine torque with respect to throttle opening and engine rotational speed.

Similarly, in a block B105, an estimated value TEM for the current engine torque is computed from the overall engine performance map shown in FIG. 5 by using the current engine rotational speed Ne and the throttle opening TVO.

In a block 106, a difference ΔTEM between the estimated value TEM2 of the engine torque at the point when speed changes begin, which is computed in the block B104, and the estimated value TEM of the current engine torque, which is computed in the block B105, is computed by using Eq. (2) below.

$$\Delta TEM = TEM2 - TEM \qquad (2)$$

ΔTEM is estimated as an engine torque amount by which the engine torque data TEC acquired in the block 103 changes during a period from its current value until the point when speed changes begin (the point when the turbine runner rotational speed reaches Nt2).

In a block B107, an estimated value TEC2 of a control engine torque at the point when speed changes begin is estimated from Eq. (3) below, using the current control engine torque data TEC and the amount of change ΔTEM in the engine torque map data from its current value to the point when speed changes start.

$$TEC2 = TEC + \Delta TEM \qquad (3)$$

In a block B108, a lockup capacity TLU2 necessary in achieving the set slip rotational speed Nslp_end at the point when speed changes begin is computed by using Eq. (4) below. The computation is made by subtracting the target converter torque TCNV2, which is computed in the block B102, from the estimated value TEC2 of the engine torque at the point when speed changes begin.

$$TLU2 = TEC2 - TCNV2 \qquad (4)$$

In a block B109, a target lockup capacity TLU' for the current turbine runner rotational speed is computed by using Eq. (5) below. The computation is made using the necessary lockup capacity TLU2 that is computed in the block B108, a lockup capacity command TLU1 of the immediately preceding cycle, the turbine runner rotational speed Nt2 at the point when speed changes begin, which is set in the block B101, the current turbine runner rotational speed Nt, and a turbine runner rotational speed Nt1 of the immediately preceding cycle.

$$TLU' = TLU1 + (TLU2 - TLU1) \times (Nt - Nt1)/(Nt2 - Nt1) \qquad (5)$$

Eq. (5) is an equation for sequential computation, based on the value of the turbine runner rotational speed, of the necessary lockup capacity for a period until the turbine runner rotational speed Nt reaches the turbine runner rotational speed Nt2 at the point when speed changes begin.

Figure 12:
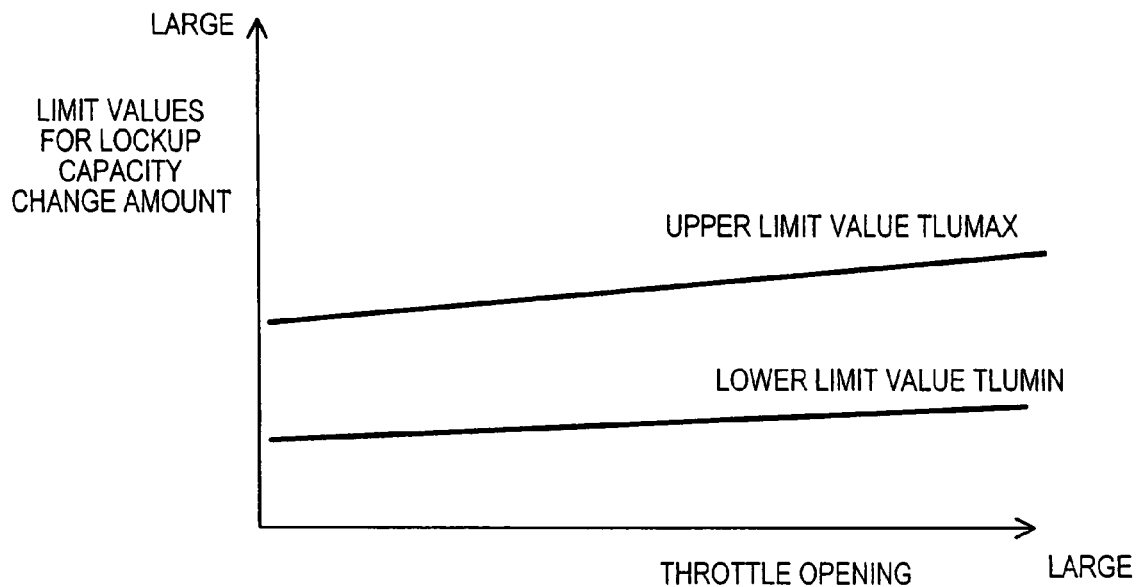
FIG. 12 is a table that shows relationships between throttle opening and limit values for an amount of change in lockup capacity.

In a block B110, an amount of change in each of the target lockup capacity TLU', which is computed in the block B109, and the lockup capacity command TLU1 of the immediately preceding cycle is computed, and upper and lower limit control is executed with respect to this value. Referring to a table in FIG. 12, an upper limit value ΔTLUMAX and a lower limit value ΔTLUMIN are set based on the current throttle opening, and a lockup capacity command change amount ΔTLUa in the current control cycle is computed by using Eq. (6) below.

$$\Delta TLUa = \mathrm{mid}(\Delta TLUMIN, (TLU' - TLU1), \Delta TLUMAX) \qquad (6)$$

Herein, "mid( )" means selecting the median value from among the variables listed within the parenthesis.

In a block B111, values that are selected change according to driving conditions in accordance with a flowchart of FIG. 4, described hereinafter. The explanation here continues under the premise that the value ΔTLUA that is computed in the block B110 is selected, and that ΔTLU has reached ΔTLUA.

In a block B112, a lockup capacity command value TLU for the current control cycle is computed by using Eq. (7) below. The computation is made by adding the lockup capacity command change amount ΔTLU, which is selected in the block B111, to the lockup capacity command TLU1 of the immediately preceding cycle.

$$TLU = TLU1 + \Delta TLU \qquad (7)$$

Figure 7:
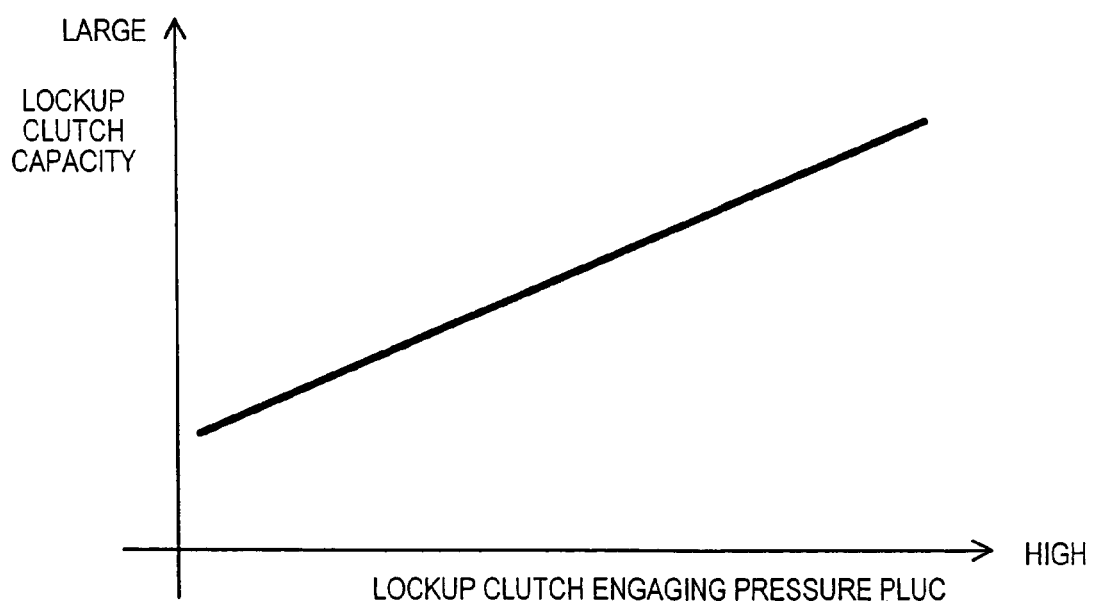
FIG. 7 is a table that shows a relationship between engaging pressure and capacity of a lockup clutch.

In a block B113, by referring to a table in FIG. 7, a lockup clutch engaging pressure command value PLUC is set in order to achieve the current lockup capacity command value TLU.

In a block B114, a duty ratio SDUTY is determined in order to make the actual lockup clutch engaging pressure equal to the lockup clutch engaging pressure command value PLUC.

The lockup capacity command value TLU is thus computed together with the increasing turbine runner rotational speed Nt to reach the set slip rotational speed Nslp_end at the point where speed changes begin (when the turbine runner rotational speed=Nt2) during open loop control, before beginning speed changes in which the turbine runner rotation increases.

Figure 13:
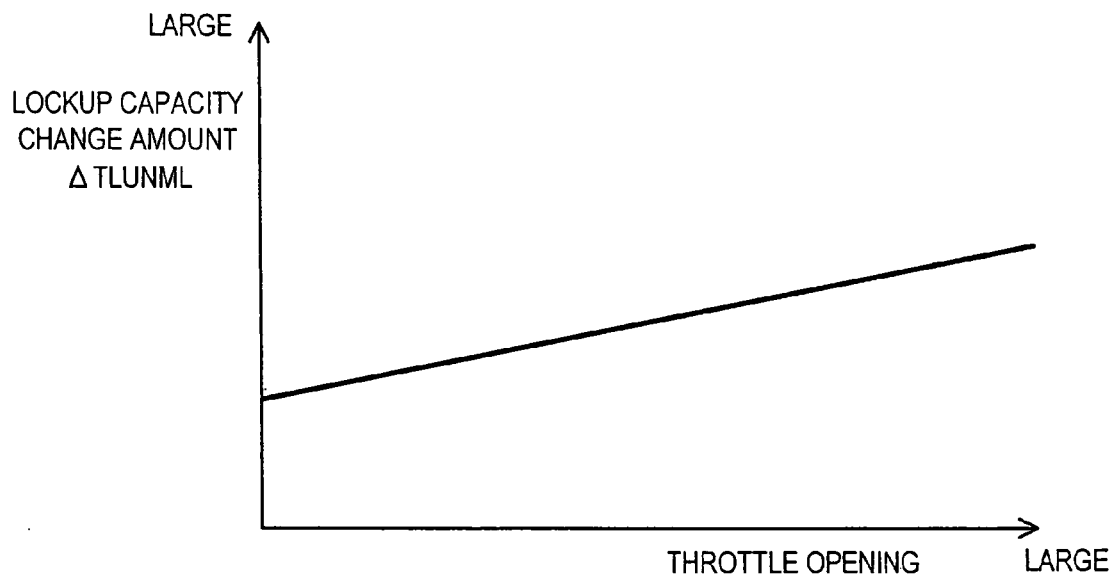
FIG. 13 is a table that shows a relationship between throttle opening and an amount of change in lockup capacity.

Further, in a block B115, by referring to a lockup capacity command change amount table during normal operation shown in FIG. 13, a lockup capacity command change amount ΔTLUNML during normal operation is set based on the current throttle opening TVO.

In a block B116, output values are changed by a predetermined time constant from the lockup capacity command change amount ΔTLU1 of the immediately preceding cycle to the lockup capacity command change amount ΔTLUNML set in the block B115. A lockup capacity command change amount ΔTLUb is thus made to gradually converge to the value set in the block B115.

Figure 14:
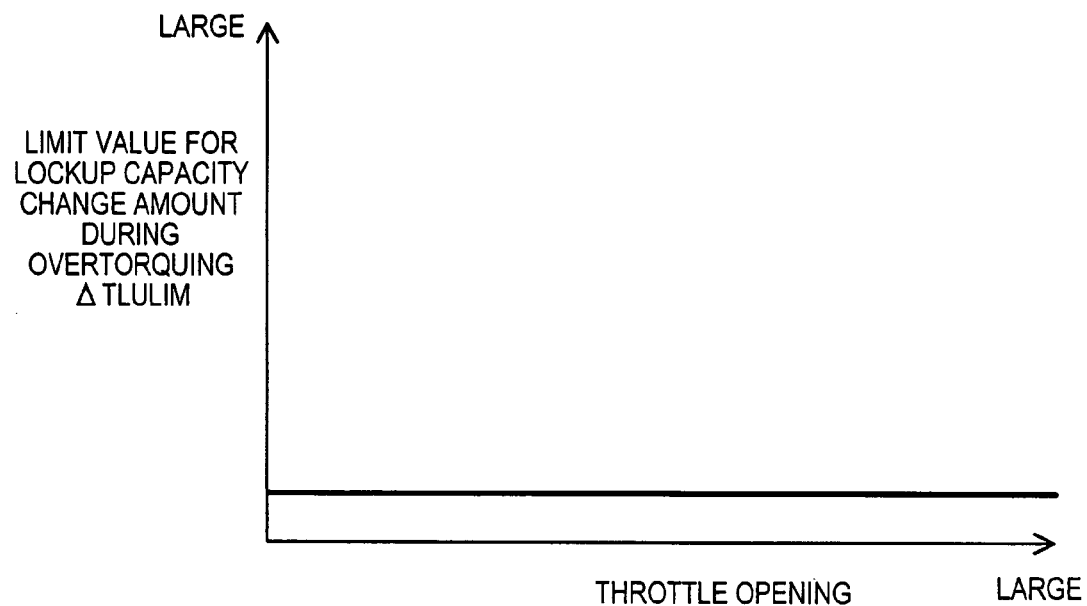
FIG. 14 is a table that shows a relationship between throttle opening and a limit value for an amount of change in a lockup capacity command during overtorquing.

Further, in a block B117, by referring to a lockup capacity command change amount table during overtorquing shown in FIG. 14, a lockup capacity command change amount ΔTLULIM during overtorquing is set based on the current throttle opening TVO when the engine torque TEC is equal to or greater than the lockup capacity TLU, and when the engine torque TEC appears ready to exceed the lockup capacity TLU.

In a block B118, output values are changed with a delay by a predetermined time constant from the lockup capacity command change amount ΔTLU1 of the immediately preceding cycle to the lockup capacity command change amount ΔTLULIM set in the block B117. A lockup capacity command change amount ΔTLUc is thus made to gradually converge to the value set in the block B117. Although not shown in the drawings, as for the values of the lockup capacity command TLU1 of the immediately preceding cycle, the lockup capacity change value ΔTLU1, and the turbine runner rotational speed Nt1, the values for the current cycle are stored until the next cycle.

Taking the computations in the blocks B100 to B110 as a computation processing A, taking the computations in the blocks B115 and B116 as a computation processing B, and taking the computations in the blocks B117 and B118 as a computation processing C, the selection processing of the computation processes in the block B111 is explained.

Figure 4:
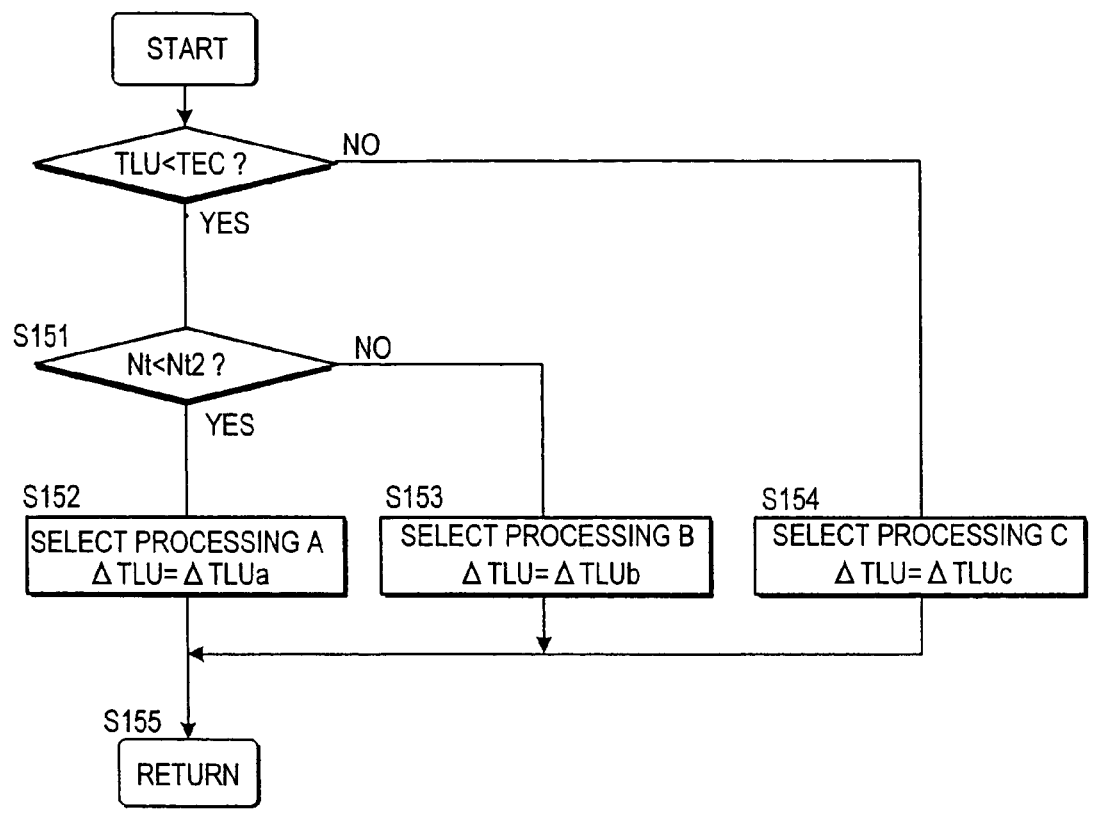
FIG. 4 is a flowchart that shows selection processing performed by a block B111 of FIG. 3.

The flowchart of FIG. 4 shows a selection method in the block B111. Any one of the computation processing A, B, and C described above is selected by procedures described hereinafter.

In a step S150, the computed lockup capacity command TLU and the engine torque TEC are compared. Control proceeds to a step S151 if the lockup capacity command TLU is less than the engine torque TEC. Otherwise control proceeds to a step S154.

In the step S151, the turbine runner rotational speed Nt2 at the point where speed changes begin, which is set in the block B101, and the current turbine runner rotational speed Nt are compared. If the current turbine runner rotational speed Nt is less than the turbine runner rotational speed Nt2 at the point where speed changes begin, control proceeds to a step S152. Otherwise control proceeds to a step S153.

In the step S152, the lockup capacity command change amount ΔTLU is computed for a process in which the turbine runner rotational speed, before the point where speed changes begin, increases. The computation is made by using the procedures of the blocks B100 to B111 (the computation processing A).

In the step S153, the lockup capacity command change amount ΔTLU is computed for a state where increases in the turbine runner rotational speed, after the point where speed changes begin, have stopped. The computation is made by using the procedures of the blocks B115, B116, and B111 (the computation processing B).

In the step S154, the lockup capacity command change amount ΔTLU is computed with respect to a case where the lockup capacity command value exceeds the engine torque. The computation is made by using the procedures of the blocks B117, B118, and B111 (the computation processing C).

In the block B111, the lockup capacity command TLU is computed by adding the lockup capacity command TLU1 of the immediately preceding cycle to the computed capacity command change amount ΔTLU1.

FIG. 17 is a diagram showing a case when the vehicle starts moving from a stopped state and the torque converter 1 switches from the converter state to the slip state. The lockup capacity is computed by using the computation processing A. The lockup capacity change value ΔTLU is computed by starting open loop control from a time t1, and computing the necessary lockup capacity TLU2 at the point Nt2 when speed changes begin.

The lockup capacity command TLU is recomputed by using Eq. (5) according to increases in the turbine runner rotational speed. The lockup capacity command TLU changes in response to the turbine runner rotational speed from an initial capacity at the time t1 to a necessary capacity when open loop control ends at the time t2.

Further, relative changes (characteristics of torque changes with respect to changes in the engine rotational speed or the throttle opening) have substantially the same tendency, even if there are differences in peak outputs due to individual difference of the engine. Accordingly, using only the amount of change of the table data (FIG. 5) when estimating the control engine torque data in the block B107 of FIG. 2 is helpful in reducing absolute errors. The estimation accuracy of the control engine torque data TEM2 at the point where speed changes begin is thus increased.

Figure 18:
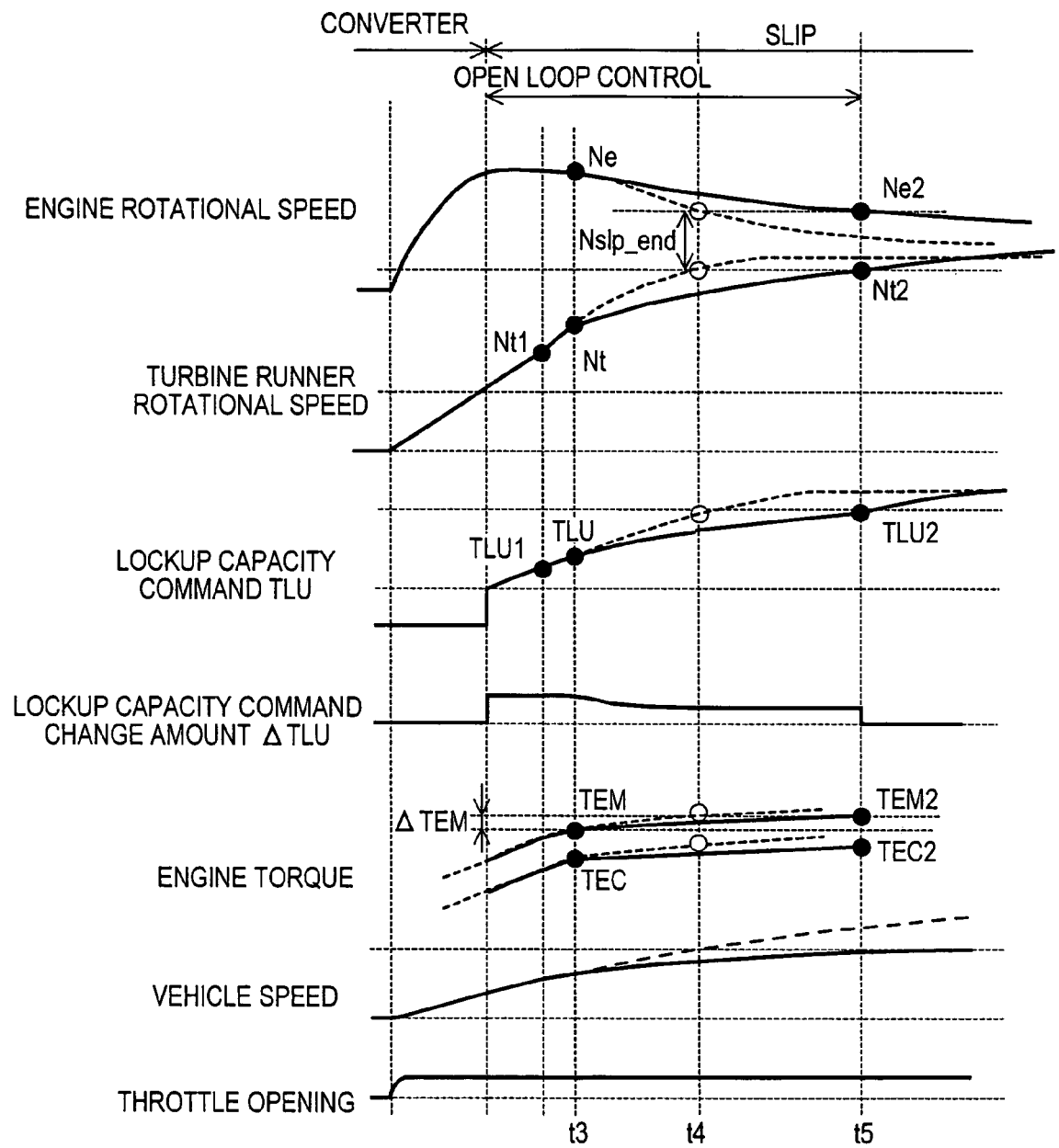
FIG. 18 is a timing chart that shows states when a torque converter transitions from a converter state to a slip state when a vehicle enters a climbing roadway with a throttle opening kept constant.

FIG. 18 is a diagram showing a case where changes in vehicle speed have become moderate at a time t3 due to entering a climbing roadway or the like with the throttle opening held constant, that is, when acceleration slows down. The timing at which open loop control ends extends from a time t4 to a time t5 accompanying the slowdown in acceleration. It should be noted that a broken line in FIG. 18 shows a case where there is no slowdown in acceleration.

The turbine runner rotational speed Nt2 at the point where speed changes begin (the time t5) and the slip rotational speed Nslp_end are dependent upon the throttle opening. Accordingly, the set values for turbine runner rotational speed Nt2 and the slip rotational speed Nslp_end do not change. However, increases in vehicle speed become moderate, and changes in the turbine runner rotational speed also become moderate. The lockup capacity change amount ΔTLU thus decreases in a period from the time t3 to the time t5 due to recomputation of the lockup capacity command TLU (white circles in FIG. 18 show values before resetting, and black circles in FIG. 18 show values after resetting).

Figure 19:
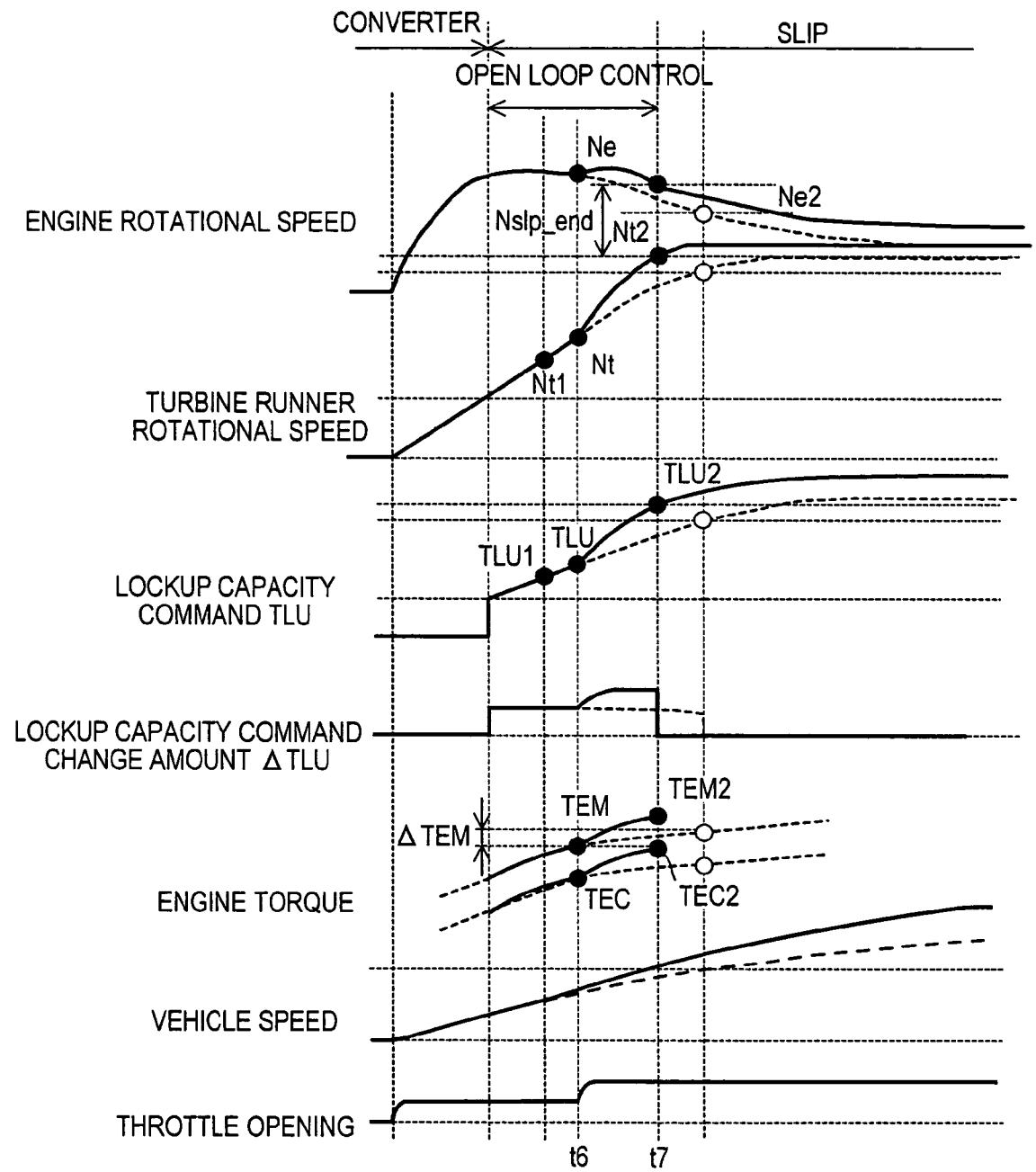
FIG. 19 is a timing chart that shows states when a throttle opening is increased while a torque converter is transitioning from a converter state to a slip state.

FIG. 19 is a diagram showing a case where the throttle opening TVO increases at a time t6. In this case, the turbine runner rotational speed Nt2 and the slip rotational speed Nslp_end, which are set depending upon the throttle opening, are newly set at the point where speed changes begin (a time t7 in FIG. 19). In addition, the turbine runner rotational speed also increases. Accordingly, the lockup capacity change amount ΔTLU increases in a period from the time t6 to the time t7 due to the recomputation of the lockup capacity command TLU.

Figure 20:
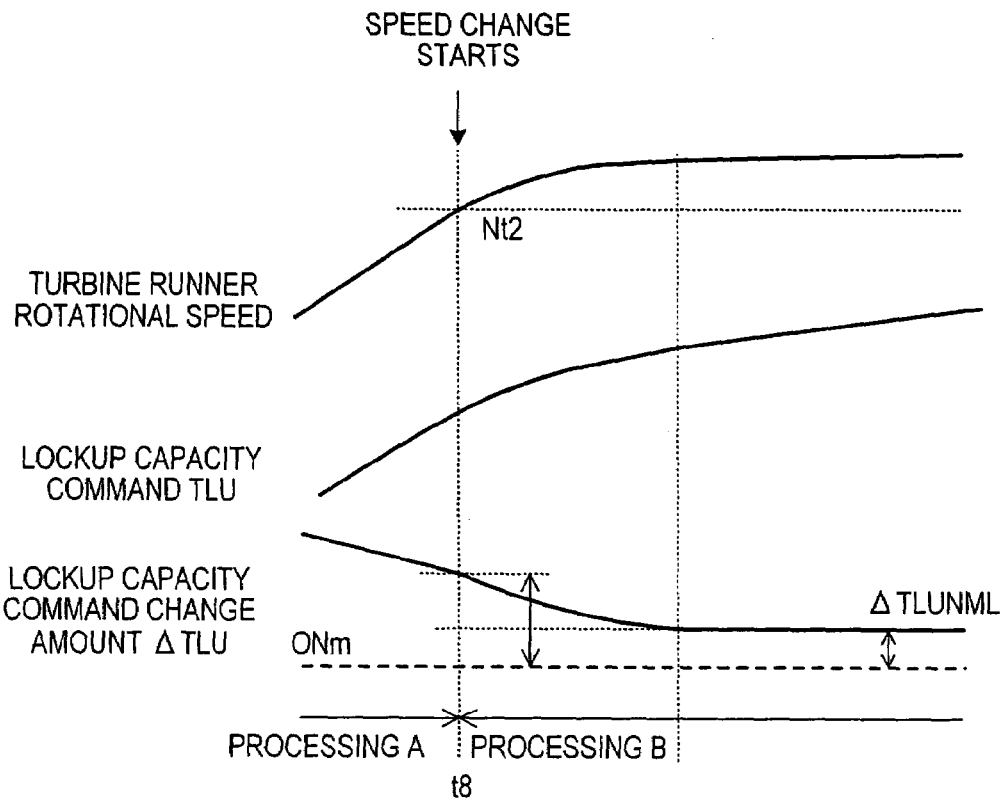
FIG. 20 is a timing chart that shows a state when computation processing of a lockup capacity change amount is switched from a processing A to a processing B.

FIG. 20 is a diagram showing a case where the turbine runner rotational speed becomes larger than the target turbine runner rotational speed Nt2, and computation of the lockup capacity change amount ΔTLU switches from the processing A to the processing B. Switching can thus be made from computation dependent upon the turbine runner rotational speed to conventionally setting an increase amount that is dependent upon the throttle opening TVO. With the computation processing A, a state results where there is no increase in the pressurization amount if the turbine runner rotational speed becomes substantially constant together with speed changes starting from a time t8. By switching to the conventional setting process, however, pressurization operations can be continued.

Further, switching is performed gradually, not suddenly, from the lockup capacity change amount ΔTLU by the computation processing to the map data at the switching point (the time t8) A when switching between the computation processes. Accordingly, rapid changes in the lockup capacity command TLU can be prevented.

Figure 21:
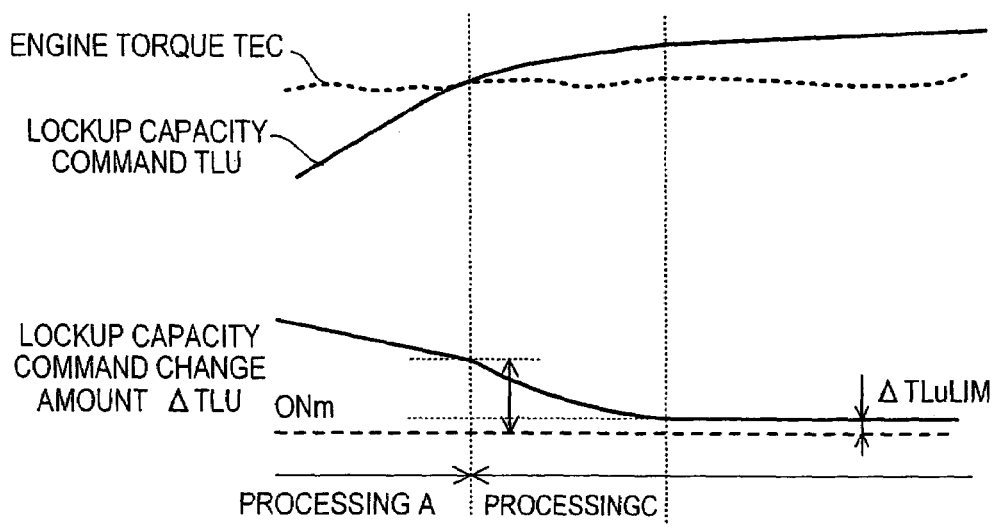
FIG. 21 is a timing chart that shows a state when computation processing of a lockup capacity change amount is switched from the processing A to a processing C.

FIG. 21 is a diagram showing a case where the computation processing for the lockup capacity change amount switches from the computation processing A to the computation processing C because the computed lockup capacity command TLU becomes larger than the engine torque TEC. Switching to the set control limit value ΔTLULIM can thus be made even when the lockup capacity command TLU exceeding the engine torque is computed. Accordingly, sudden engagement of the lockup clutch due to over-pressurization and the like can be prevented from developing.

Further, switching is performed gradually when switching between the computation processes, similar to the switching of FIG. 20 descried above. The lockup capacity command TLU thus does not change suddenly. Although a case where the set value is not zero is shown in FIG. 21, pressurization can be completely stopped by setting a value of zero.

As described above, with this invention the converter torque (target converter torque) TCNV2 and the engine torque TEC2 at the point when open loop control ends (the point when speed changes begin) are estimated, and the necessary lockup capacity TLU2 at the point where open loop control ends is found from the estimated values TCNV2 and TEC2. The differential pressure command value (the lockup clutch engaging pressure command value PLUC) is set such that the lockup capacity at the point when open loop control ends becomes the necessary lockup capacity amount TLU2. The engaging state of the lockup clutch is controlled based on the differential pressure command value.

Specifically, pressurization operations are performed from the converter state to cause the slip rotational speed in the turbine runner rotational speed at the point where speed changes begin to become a predetermined rotational speed. The necessary lockup amount TLU2 to make the slip rotational speed in the turbine runner rotational speed at the point where speed changes begin become a predetermined rotational speed is computed by using the turbine runner rotational speed and the slip rotational speed for the current time and for the point where speed changes begin, and the current throttle opening. The computation is based on the engine torque data that is received from an external engine controller, through the control network inside the vehicle, and the engine torque map data and torque converter characteristic data (capacity coefficient map) that are stored in an internal portion of the controller 5. The differential pressure command value is set so that the necessary lockup capacity TLU2 is reached in open loop control.

Figure 16:
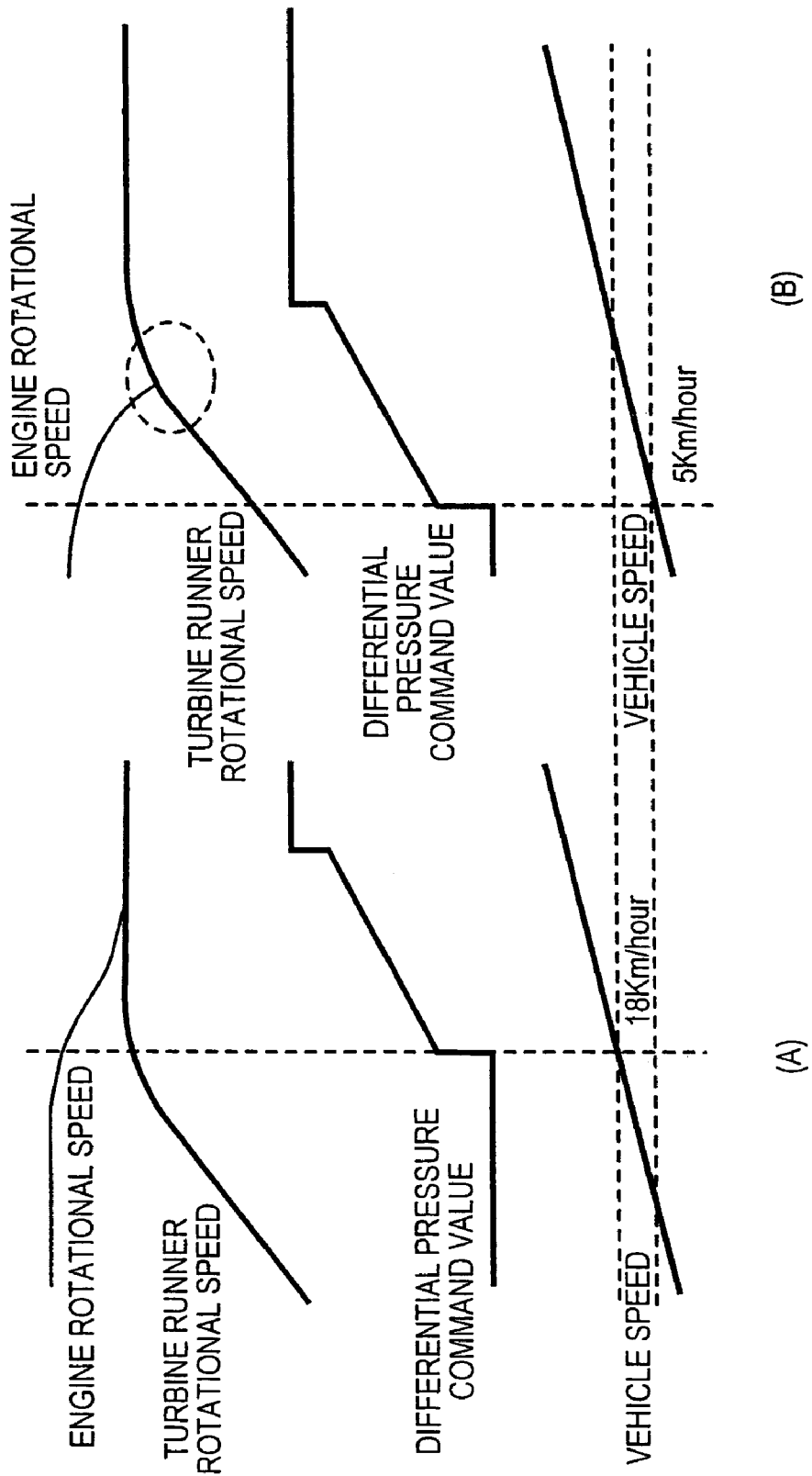
FIGS. 16A and 16B are timing charts for a torque converter that is transitioning from a converter state to a slip state in a conventional technique when running at low speed along a flat roadway and when running at low speed along a climbing roadway, respectively.

Sudden engaging of the lockup clutch (refer to FIG. 16B) due to over-increases in the lockup capacity, and engaging delays due to insufficient lockup capacity are thus prevented in open loop control.

When the throttle opening changes during open loop control, the necessary lockup capacity TLU2 for generating the slip rotational speed set at the point where speed changes begin is recomputed, the differential pressure is reliably increased, and slip control is continued.

The necessary lockup capacity for the period during which the turbine runner rotational speed increases is sequentially computed and updated based on the current turbine runner rotational speed Nt. The computation is made by using the computed necessary lockup capacity TLU2, past turbine runner rotational speed Nt1 and lockup capacity TLU1 (for example, the immediately preceding turbine runner rotational speed and lockup capacity). The lockup capacity also increases together with increases in the turbine runner rotational speed. Accordingly, when increases in the turbine runner rotational speed become moderate or rapid during open loop control, such a situation can be suitably handled.

The lockup capacity can therefore be finally set to the necessary lockup capacity TLU2 at the point where speed changes begin. Further, the lockup capacity TLU2 necessary for the point when speed changes begin is recomputed as described above even when the throttle opening changes during open loop slip control. An optimal pressurization amount can thus always be set.

Furthermore, the lockup capacity command change amount ΔTLUa is limited by the upper limit value ΔTLUMAX and by the lower limit value ΔTLUMIN. The minimum value necessary for the pressurization speed can be set when the lockup command change amount ΔTLUa is set to the lower limit value. The occurrence of engaging timing delays during lockup, and the occurrence of delays in the tiring at which the constant slip state begins during slip control, which are caused by insufficient pressurization, can thus be prevented. The pressurization speed is limited to the upper limit when the lockup command change amount ΔTLUA is set to the upper limit value. Sudden engaging operations of the lockup clutch due to an overly fast pressurization speed, and the occurrence of sudden decreases in engine rotation following the sudden engaging operations, can thus be prevented.

Control switches to the computation processing B described above, which performs conventional pressurization amount setting dependent upon the throttle opening, when the start of speed changes is detected. The conventional pressurization amount can thus be ensured, even in states where the increase in the turbine runner rotational speed becomes moderate, or becomes substantially constant, together with the start of speed changes. The occurrence of delays in the engaging timing in lockup due to insufficient pressurization, and the occurrence of delays in the tiring at which the constant slip state begins during slip control, can be prevented.

Further, when the computed lockup capacity command TLU becomes larger than the estimated engine torque TEC, and when the computed lockup capacity command TLU appears ready to become larger than the estimated engine torque TEC, increases in the command value, and continued pressurization can be avoided by making the lockup pressurization change amount smaller, regardless of whether the lockup capacity command TLU becomes too large due to delays (wasted time) in actual capacity in the lockup clutch.

In addition, in the block B118, change is effected from the lockup capacity command change amount ΔTLU1 of the immediately preceding cycle to the lockup capacity command change amount ΔTLULIM with a predetermined time constant. The lockup capacity command change amount ΔTLUc can thus be made to gradually converge to the lockup capacity command change amount ΔTLULIM during the overtorquing set in the block B117. Rapid changes in the pressurization speed due to limiter operation (the lockup capacity command change amount ΔTLULIM during overtorquing) are thus prevented, and rapid changes to the slip rotational speed (engine rotational speed) can be avoided.

During selection of the computation processing of FIG. 4 descried above or the like, hunting in the selection result can be prevented when judging the turbine runner rotational speed and the engine torque provided that a hysteresis is set.

Figure 2:
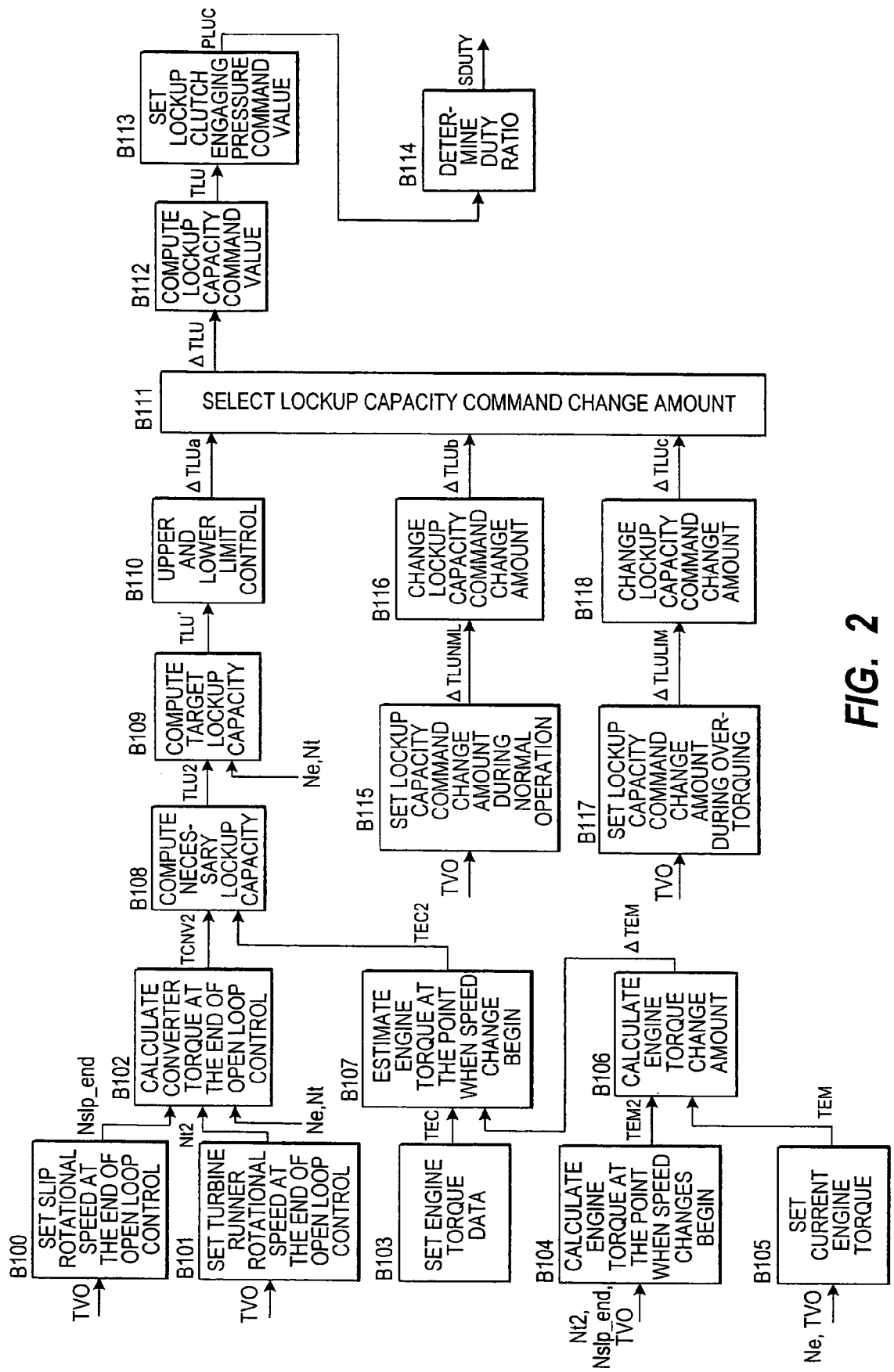
FIG. 2 is a control block diagram of a controller.

In the block B109 of FIG. 2 described above, values of the immediately preceding cycle are used as the turbine runner rotational speed and the lockup capacity used in computations. However, values of a predetermined preceding period set in advance (predetermined cycle) may also be used. Provided that values of the predetermined preceding period are used, the ratio between the amount of change in the turbine runner rotational velocities (Nt−Nt1) and (Nt2−Nt1) in Eq. (5) becomes larger, and changes in the turbine runner rotational speed can be deterred from becoming oscillatory, even when the turbine runner rotational speed increases in an oscillatory manner.

Furthermore, the turbine runner rotational speed Nt2 set in the block B101 of FIG. 2 is used as means for switching the computation processing following the start of speed changes in the step S151 of FIG. 4. However, it is also possible to substitute speed change command values, actual speed change ratios, and the like for the switching means, provided that the means enables judgment of changes in speed.

Figure 15:
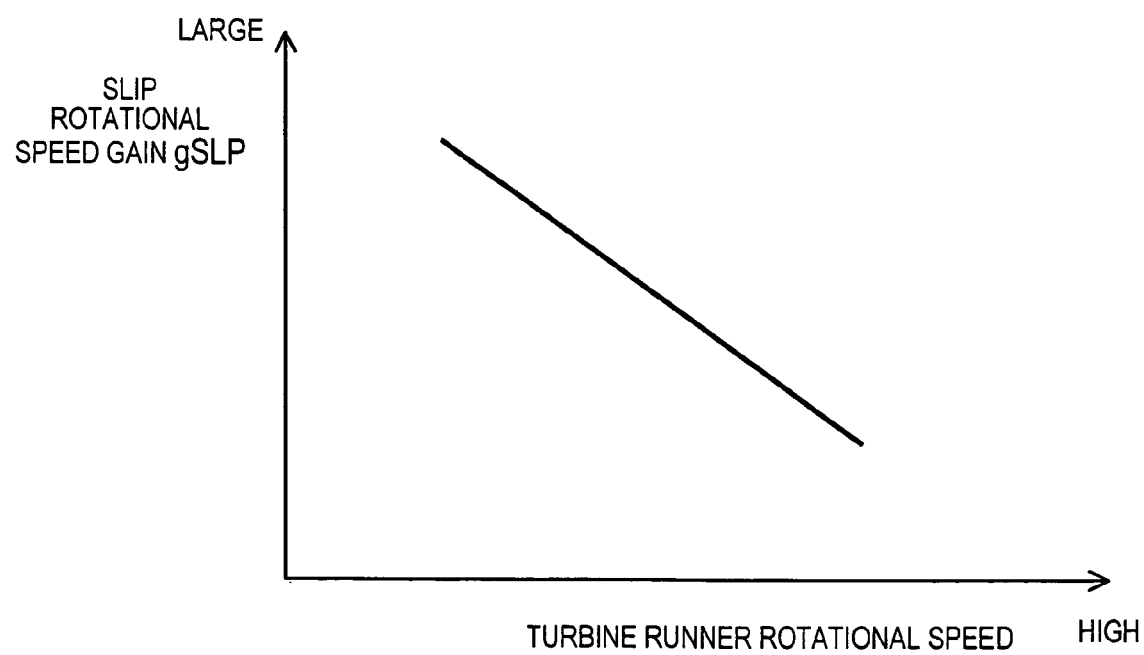
FIG. 15 is a table that shows a relationship between turbine runner rotational speed and slip rotational speed gain.

Further, in the block B102 of FIG. 2, the converter torque TCNV2 at the end of open loop control is computed by using the torque converter characteristic data (the capacity coefficient C). However, a slip rotational speed gain map like that of FIG. 15 is provided in advance in the case where the slip rotational speed control described in JP03183235B is used. Accordingly, the converter torque TCNV2 at the end of open loop control can also be computed by using Eq. (8) below provided that a slip rotational speed gain gSLP is found by referencing the map.

$$TCNV2 = Nslp\_end/gSLP \qquad (8)$$

The amount of program data that is loaded into the controller 5 can thus be reduced, and the capacity required of storing means such as memory can be reduced.

Further, the slip rotational speed at the point when open loop control ends, set in the block B100 of FIG. 2, and the slip rotational speed that is set in the step S8 of FIG. 3 as the condition for ending open loop control are set by using the same map of FIG. 14. However, separate maps may also be used depending on the application conditions.

The entire contents of Japanese Patent Application P2003-382637 (filed Nov. 12, 2003) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A power transmission device which transmits power of an engine to a drive wheel, the power transmission device comprising:
   an automatic transmission;
   a torque converter comprising a lockup clutch, the torque converter being disposed between the engine and the automatic transmission;
   a switching mechanism which switches an engaging state of the lockup clutch; and
   a controller which performs open loop control of the engaging state of the lockup clutch through the switching mechanism, when the torque converter transitions from a first state in which the lockup clutch is disengaged to a second state in which the lockup clutch is at least partially engaged,
   wherein the controller:
   estimates a torque of the engine at a time when the open loop control ends;
   estimates a necessary lockup capacity required for the converter at the time when the open loop control ends, based on the estimated torque of the engine; and
   controls the engaging state of the lockup clutch through the switching mechanism to make a lockup capacity, at the time when the open loop control ends, become the necessary lockup capacity.

2. The power transmission device as defined in claim 1, wherein:
   the controller begins to transition the converter from the first state to the second state before the transmission begins speed changes; and
   the time when the open loop control ends is a time when the automatic transmission begins speed changes.

3. The power transmission device as defined in claim 1, wherein the controller recomputes the necessary lockup capacity during a period while a turbine runner rotational speed of the torque converter is increasing.

4. The power transmission device as defined in claim 3, wherein the controller limits the necessary lockup capacity to prevent the necessary lockup capacity from exceeding an upper limit value and a lower limit value which are determined in advance.

5. The power transmission device as defined in claim 1, wherein:
   the controller computes the necessary lockup capacity based on the turbine runner rotational speed of the torque converter during a period while the turbine runner rotational speed of the torque converter is less than a predetermined value; and
   the controller computes the necessary lockup capacity based on a throttle opening of the engine when the turbine runner rotational speed of the torque converter becomes larger than the predetermined value.

6. The power transmission device as defined in claim 5, wherein the predetermined value is the turbine runner rotational speed at the time when the open loop control ends.

7. The power transmission device as defined in claim 1, wherein:
   the controller computes a current torque of the engine; and the controller makes an amount of change to the necessary lockup capacity smaller when the necessary lockup capacity becomes larger than the current torque of the engine.

8. The power transmission device as defined in claim 7, wherein the controller causes the amount of change of the necessary lockup capacity to approach a limiter with a delay when limiting the amount of change of the necessary lockup capacity by the limiter.

9. A lockup control method for a torque converter, in which open loop control is performed on an engaging state of a lockup clutch when the torque converter transitions from a first state in which the lockup clutch is disengaged to a second state in which the lockup clutch is at least partially engaged, the lockup control method comprising:
   estimating an engine torque at a time when the open loop control ends;
   estimating a necessary lockup capacity required for the converter at a time when open loop control ends, based on the estimated engine torque; and
   controlling the engaging state of the lockup clutch to make a lockup capacity at the time when the open loop control ends become the necessary lockup capacity.

10. A power transmission device which transmits power of an engine to a drive wheel, the power transmission device comprising:
   an automatic transmission;
   a torque converter comprising a lockup clutch, the torque converter being disposed between the engine and the automatic transmission;
   a switching mechanism which switches an engaging state of the lockup clutch;
   means for performing open loop control of the engaging state of the lockup clutch through the switching mechanism, when the torque converter transitions from a first state in which the lockup clutch is disengaged to a second state in which the lockup clutch is at least partially engaged,
   means for estimating a torque of the engine at a time when the open loop control ends;
   means for estimating a necessary lockup capacity required for the converter at the time when the open loop control ends, based on the estimated torque of the engine; and
   means for controlling the engaging state of the lockup clutch through the switching mechanism to make a lockup capacity at the time when the open loop control ends become the necessary lockup capacity.

11. The power transmission device as defined in claim 1, wherein the controller is adapted to estimate the torque of the engine at a time when the open loop control ends prior to ending of open loop control, and wherein the controller is adapted to estimate the necessary lockup capacity required for the converter at the time when the open loop control ends prior to ending of open loop control.

12. The lockup control method as defined in claim 9, wherein estimation of the torque of the engine at a time when the open loop control ends is accomplished prior to ending of open loop control, and wherein estimation of the necessary lockup capacity required for the converter at the time when the open loop control ends is accomplished prior to ending of open loop control.

13. The power transmission device as defined in claim 10, wherein:
   the means for estimating a torque of the engine at a time when the open loop control ends is adapted to estimate the torque of the engine prior to ending of open loop control; and
   the means for estimating a necessary lockup capacity required for the converter at the time when the open loop control ends, based on the estimated torque of the engine, is adapted to estimate the necessary lockup capacity required for the converter at the time when the open loop control ends prior to ending of open loop control.

14. The power transmission device as defined in claim 1, wherein the second state in which the lockup clutch is at least partially engaged is a slip state of the lockup clutch.

15. The lockup control method as defined in claim 9, wherein the second state in which the lockup clutch is at least partially engaged is a slip state of the lockup clutch.

16. The power transmission device as defined in claim 10, wherein the second state in which the lockup clutch is at least partially engaged is a slip state of the lockup clutch.

17. The power transmission device as defined in claim 1, wherein the automatic transmission is a continuously variable transmission.

18. The lockup control method as defined in claim 9, wherein the torque converter is rotationally coupled to an automatic transmission that is a continuously variable transmission.

19. The power transmission device as defined in claim 10, wherein the automatic transmission is a continuously variable transmission.

* * * * *